Oct. 26, 1937.  W. H. OSMUNDSON  2,097,338
INTERCHANGEABLE CULTIVATOR SHOVEL BRACKET
Filed Aug. 13, 1936
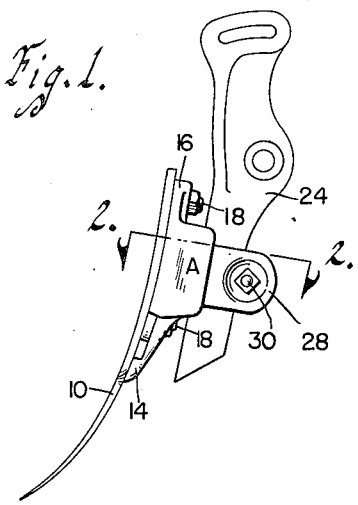
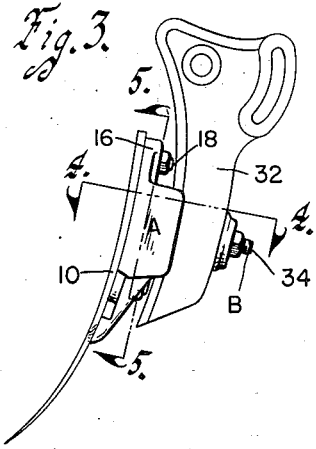
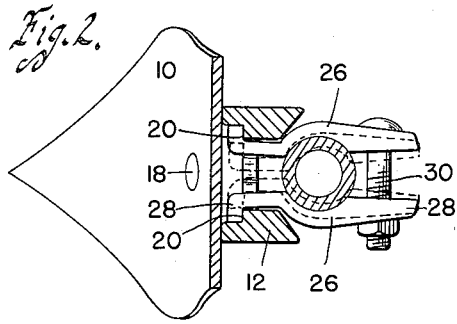
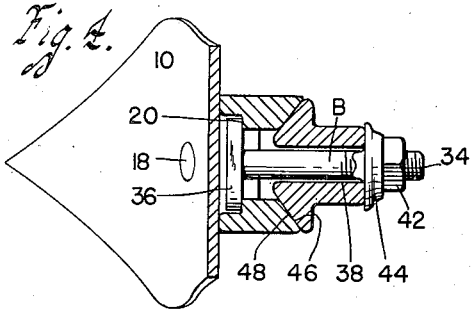
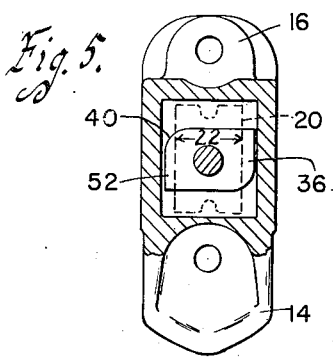
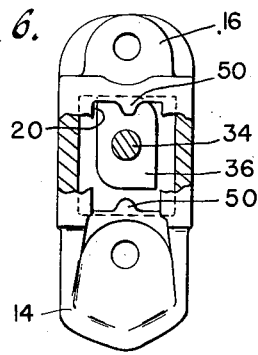
Inventor
William H. Osmundson
by Bair, Freeman & Sinclair
Attorneys
Witness
H. S. Munzenmaier Patented Oct. 26, 1937

2,097,338

UNITED STATES PATENT OFFICE 2,097,338

INTERCHANGEABLE CULTIVATOR SHOVEL BRACKET

William H. Osmundson, Perry, Iowa

Application August 13, 1936, Serial No. 95,791

5 Claims. (Cl. 97—198)

An object of my invention is to provide an interchangeable cultivator shovel bracket which is simple, durable and inexpensive to manufacture and comprises a first member secured to the shovel and other members which are selectively coactable with cultivator shanks of different character.

A further object is to provide a cultivator shovel bracket in the form of one member which can be permanently or detachably attached to a cultivator shovel, and other members for cooperation therewith, such for instance as a pair of clamp elements connectible with the bracket for encircling a round tubular type of cultivator shank, or a clamp bolt for extension through a slotted type of cultivator shank.

A further object is to provide a special type of bolt for use with the slotted type of shank which can be associated with the member attached to the cultivator shovel without the necessity of having to remove the shovel from said member, the bolt having a peculiar type of head for this purpose for cooperating with shoulders formed on the member attached to the cultivator shovel.

Still a further object is to provide clamp elements which may coact with these same shoulders with which the head of the bolt coacts so that the member attached to the shovel can be secured to a different type of cultivator shank.

With these and other objects in view, my invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of an interchangeable cultivator shovel bracket embodying my invention and showing it attached to a round cultivator shank by means of surrounding clamp elements.

Figure 2 is a sectional view on the line 2—2 of Figure 1.

Figure 3 is a view similar to Figure 1 showing the bracket attached to a slotted cultivator shank such as used for tractor type cultivators.

Figure 4 is a sectional view on the line 4—4 of Figure 3.

Figure 5 is a sectional view on the line 5—5 of Figure 3 showing the head of a special bolt in one position; and Figure 6 is a similar sectional view showing it in another position.

On the accompanying drawing I have used the reference numeral 10 to indicate a cultivator shovel. Attached to the shovel 10 is a first member A which comprises a pair of side members 12 and attaching ears 14 and 16. Bolts 18 extend through the ears 14 and 16, these bolts being of the ordinary countersunk type.

The side members 12 are each provided with a shoulder 20. The shoulders 20 face the back of the shovel 10 and are spaced from it as shown in Figure 2. Between the shoulders a space is provided as indicated by the dimension line 22, the purpose of which will hereinafter appear.

For attachment of the member A to a round tubular type of cultivator shank 24 I provide a pair of clamp elements 26 having hook ends 28 for coaction with the shoulders 20. The opposite ends of the elements 26 are provided with perforated ears 28 through which a clamping bolt 30 extends.

For mounting the cultivator shovel 10 on a slotted type of cultivator shank 32 I provide a bolt B having a shank 34 and a head 36. The shank 34 is adapted to extend through the slot 38 of the shank 32, while the head 36 is adapted to engage the shoulders 20. The head 36 is elongated as illustrated in Figures 5 and 6 and rounded at two opposite corners as indicated at 40. When in the position shown in Figure 5, the head 36 is arranged laterally of the slot in the member A, the width of which is indicated by the dimension line 22. Thus the ends of the head 36 engage under the shoulders 20 so that when a nut 42 on the bolt 34 (see Figure 4) is tightened against a washer 44, the member A is drawn tightly into engagement with the shank 32. The shank is provided with faces 46 while the sides 12 of the member A are provided with faces 48 fitting against the faces 46.

*Practical operation*

Assuming that the cultivator shovel 10 is attached to the shank 24 and it is desirable to transfer the shovel to the shank 32, the clamp bolt 30 is first loosened, whereupon the shovel 10 together with the member A and the clamp elements 26 can be removed from the shank. Thereafter the hook ends 28 can be disengaged from the shoulders 20 by swinging the hooked ends toward each other as shown by dotted lines in Figure 2 and the elements removed from the member A. The bolt 34 may then be associated with the member A by turning the elongated head 36 so that the head is alined with the shoulders 20 as in Figure 6. One end of the head can then be inserted behind a projection 50 of the member A, and the head then swung into position so that it can be turned clockwise to the position of Figure 5, whereupon it is retained from disassociation from the member A.

As the nut 42 is tightened, the corners, indicated at 52, engage the sides 12 to prevent rotation of the bolt B, so that it can be tightened with the use of only one wrench (on the nut 42). Subsequently when it is desirable to remove the shovel from the shank 32, the nut 42 can be loosened. As the bolt turns, the corners 52 will engage the sides 12 to limit such turning and permit loosening of the nut. After the nut 42 and washer 44 are removed, the shovel, together with the bolt B, can be taken off the shank 32 and then the bolt head 36 turned to the position of Figure 6, for disconnecting it from the shovel.

If it is desirable to leave the bolt on the shank 32, the nut 42 can merely be loosened sufficiently to permit the head 36 to be turned to the position of Figure 6. The projections 50, when the clamp elements 26 are used, aid in retaining the clamp elements against undesired disconnection from the shovel while placing the shovel on the shank 24.

By the disclosed construction, I am able to rigidly secure a cultivator shovel to either a cylindrical type or slotted type of cultivator shank. Changing the shovel from one shank to the other involves but a minimum of time.

Some changes may be made in the construction and arrangement of the parts of my device without departing from the real spirit and purpose of my invention and it is my intention to cover by my claims any modified forms of structure or use of mechanical equivalents which may be reasonably included within their scope.

I claim as my invention:

1. In a cultivator shovel bracket, a first member having an opening therethrough enlarged at its inner end to provide a pair of shoulders, said member being secured to a cultivator shovel and said shoulders being spaced from the back thereof and facing said back and a pair of clamp elements having hook ends adapted to enter said opening while the hook ends are closely spaced and for positioning between said shoulders and back and engaging said shoulders when said hook ends are moved away from each other, said clamp elements having encircling portions for a cultivator shank and a clamp bolt for tightening said encircling portions thereof around the cultivator shank.

2. In a cultivator shovel bracket, a first member having an opening therethrough enlarged at its inner end to provide a pair of shoulders, said member being secured to a cultivator shovel and said shoulders being spaced from the back thereof and facing said back and a pair of clamp elements having hook ends adapted to enter said opening while the hook ends are closely spaced and for positioning between said shoulders when said hook ends are moved away from each other and back and engaging said shoulders, said clamp elements having encircling portions for a cultivator shank and means for tightening said encircling portions thereof around the cultivator shank.

3. In a device of the class described, a first member having an elongated opening therethrough enlarged at its inner end to provide a pair of shoulders and having a pair of spaced faces on opposite sides of said elongated opening, said member being secured to a cultivator shovel and said shoulders being thereby fixed relative to the back thereof and a second member comprising a bolt having a head and shank, said head being shaped to enter said elongated opening and thereafter rotatable for positioning opposite edges thereof against said shoulders and said bolt shank being for extension through a slotted cultivator shank when the shank is positioned against said faces.

4. In a device of the class described, a first member having an elongated rectangular opening therein, said opening being enlarged at its inner end to provide a pair of shoulders, said member being secured to a cultivator shovel and said shoulders being thereby fixed relative to the back thereof and a second member comprising a bolt having an elongated rectangular head and a shank, the longer sides of said head being for positioning against said shoulders and said bolt shank being for extension through a slotted cultivator shank, said head passing between said shoulders when said head is aligned with them and such positioning against said shoulders occurring after said head has entered said enlarged inner end of said opening and is then turned laterally relative to said shoulders.

5. In a device of the class described, a first member having a pair of shoulders, said member being secured to a cultivator shovel and said shoulders being thereby fixed relative to the back thereof and a second member comprising a bolt having a head and shank, said head being for positioning against said shoulders and said bolt shank being for extension through a slotted cultivator shank, said head being elongated for passage between said shoulders when said head is aligned with them and for engagement with said shoulders when it is turned laterally relative to them, said head being rectangular with two opposite corners thereof rounded to permit turning of said head in one direction of rotation for engagement with said shoulders after said head has been passed between them and to thereafter prevent further turning thereof when the nut on said bolt is tightened.

WILLIAM H. OSMUNDSON.